United States Patent [19]

Manabe et al.

[11] Patent Number: 4,581,140

[45] Date of Patent: Apr. 8, 1986

[54] POROUS REGENERATED CELLULOSE MEMBRANE AND PROCESS FOR THE PREPARATION THEREOF

[75] Inventors: Seiichi Manabe, Ibaraki; Michitaka Iwata, Osaka; Mamoru Inoue, Nobeoka, all of Japan

[73] Assignee: Asahi Kasei Kogyo Kabushiki Kaisha, Osaka, Japan

[21] Appl. No.: 443,074

[22] Filed: Nov. 19, 1982

[30] Foreign Application Priority Data

| Nov. 25, 1981 | [JP] | Japan | 56-187795 |
| Nov. 25, 1981 | [JP] | Japan | 56-187796 |
| Nov. 25, 1981 | [JP] | Japan | 56-187797 |
| Nov. 25, 1981 | [JP] | Japan | 56-187798 |
| Sep. 8, 1982 | [JP] | Japan | 57-155106 |
| Sep. 8, 1982 | [JP] | Japan | 57-155107 |

[51] Int. Cl.$^4$ ............................................. B01D 13/00
[52] U.S. Cl. ................................. 210/500.2; 264/41
[58] Field of Search .................. 210/321.3, 500.2, 655; 264/199, 41

[56] References Cited

U.S. PATENT DOCUMENTS

| 3,592,953 | 7/1971 | Ward, III et al. | 210/500.2 X |
| 4,388,256 | 6/1983 | Ishida et al. | 210/500.2 X |

FOREIGN PATENT DOCUMENTS

| 0008536 | 3/1980 | European Pat. Off. | 210/500.2 |
| 2823985 | 12/1979 | Fed. Rep. of Germany | 210/500.2 |
| 2835890 | 2/1980 | Fed. Rep. of Germany | 210/500.2 |
| 3042110 | 6/1982 | Fed. Rep. of Germany | 210/500.2 |

OTHER PUBLICATIONS

Meltzer, et al., "Optimized Cellulose Membranes for Artificial Kidney Dialysis Applications", from vol. XIV, Trans. Am. Soc. Art. Int. Organs, pp. 12–18, 1968.

Primary Examiner—Frank Spear
Attorney, Agent, or Firm—Sprung Horn Kramer & Woods

[57] ABSTRACT

A porous regenerated cellulose membrane consisting essentially of cellulose molecules having a viscosity average molecular weight of at least about $5 \times 10^4$, the crystalline region of the cellulose molecules being substantially cellulose II crystal, cellulose III-2 crystal or the mixture thereof and having a degree of crystal orientation at a face of (101) in the crystalline region in the direction of the surface of the membrane of at most about 40%, the membrane having a dynamic modulus at 30° C. measured with a frequency of 110 Hz of at least about $1.5 \times 10^8 (100\text{-pr}\rho)$ dyn/cm$^2$ wherein Pr$\rho$ is a porosity by percentage, a mean pore size represented by D($\mu$m) of about 0.01 $\mu$m to about 20 $\mu$m and at the same time a porosity in a plane of at least one plane of at least about 30% or a number of pores in a plane per 1 cm$^2$ of about $6 \times 10^5/D$ to about $3 \times 10^7/D$; and a process for preparing the same.

24 Claims, 2 Drawing Figures

POROUS REGENERATED CELLULOSE MEMBRANE AND PROCESS FOR THE PREPARATION THEREOF

DESCRIPTION

1. Technical Field

This invention relates to a porous regenerated cellulose membrane and a process for its preparation.

2. Background Art

Of techniques for separating and purifying substances, the one using a membrane is known. This technique does not require change in temperature accompanying the separation of substances, for example, by distillation and the amount of energy necessary for the separation of substances is small. Furthermore, the process of the separation is compact. These characteristic features of a separation process using membranes are advantageously employed and polymeric membranes are used in a wide range of fields such as dairy farming, fisheries and livestock industry, food processing, pharmaceutical industry, chemical industry, fiber dyeing and processing, steel industry, machine industry, surface treatment, water treatment and atomic energy industry. Possible fields where the membrane separation system may become a main technique in the near future are considered to include (a) a field where condensation, purification and recovery are required to be carried out at low temperatures, e.g., food and biochemical industries, (b) a field where an aseptic and dust-free condition is necessary, e.g., pharmaceutical industry and therapeutical institution and electronic industry, (c) a field where a small amount of expensive substances is condensed and recovered, e.g., atomic energy industry and heavy metal industry, (d) a field where a very small amount of specified substances is separated, e.g., pharmaceutical industry and (e) a field where a large amount of energy is consumed, e.g., substitution for distillation. Membranes which can be used in these fields must be hydrophilic membranes having a large Pore size and ease of handling.

As a typical example of a porous membrane made from a hydrophilic polymer i.e., cellulose, there is known a porous membrane for an artificial kidney having a mean pore size of at most 100 Å (=0.01 $\mu$m). Since the pore size of the porous membrane is small and at the same time its porosity is small, i.e., at most 10%, this porous membrane can hardly be used in ultrafiltration or microfiltration.

It is also known that a porous regenerated cellulose membrane can be produced by saponifying a cellulose derivative membrane such as a cellulose acetate membrane and a cellulose nitrate membrane with an aqueous alkaline solution. The porous membrane thus obtained has a mean pore size of 0.01 to 2 $\mu$m and a viscosity average molecular weight after the regeneration of at most $3.5 \times 10^4$ since a cellulose derivative is employed as the starting material for preparing the porous membranes. The viscosity average molecular weight of the cellulose molecule which constitutes the conventional porous regenerated cellulose membranes having pores whose mean pore size is in such a range is at most $4.0 \times 10^4$. For this reason the mechanical properties, especially mechanical strength of the porous membrane in a dry state is remarkably low and brittle. For example, when the porosity of a porous membrane is designated Pr$\rho$(%), its modulus becomes about $10^2(100-\text{Pr}\rho)^3\text{dyn/cm}^2$ and the tensile strength at break is nearly proportional to the modulus and is about one-tenth of the modulus. Moreover, the mechanical strength of the porous membrane in a swollen state becomes lower than that in a dry state and as a result, the conventional porous regenerated cellulose membrane obtained from cellulose derivatives sometimes breaks in handling. The above described method of producing a porous regenerated cellulose membrane by regenerating a cellulose derivative is also disadvantageously long in the production process and high in cost.

Further there is known a method of producing a porous membrane by mixing an emulsion of kerosene with a cellulose cuprammonium solution. The means pores size of the porous membrane obtained by this method is at least 1 $\mu$m but the pore shape is non-circular and the pore portion forms a layer structure and accordingly, the porous membrane is very brittle and the percentage of straight-through pores per total pores is small. In addition, since and emulsion is mixed with a solution for casting such as a cellulose cuprammonium solution, the solution obtained is unstable and it is very difficult to industrially form porous membranes with good reproducibility. The pore size of a porous membrane which is obtained by mixing a cellulose cuprammonium solution with a non-coagulating liquid and immersing the solution obtained in a coagulating liquid for coagulation is at most 0.01 $\mu$m and the permeability is poor.

DISCLOSURE OF THE INVENTION

An object of the present invention is to provide a porous regenerated cellulose membrane having a larger pore size and at the same time excellent mechanical properties and ease of handling.

Another object of the present invention is to provide a process for preparing such a porous regenerated cellulose membrane.

Additional objects and advantages of the invention will be set forth in the description that follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the porous regenerated cellulose membrane of this invention consists essentially of cellulose molecules having a viscosity average molecular weight of at least about $5 \times 10^4$, the crystalline region of the cellulose molecules being substantially cellulose II crystal, cellulose III-2 crystal or the mixture thereof and having a degree of crystal orientation at a crystal face of (101) in the crystalline region in the direction of the surface of the membrane of at most about 40%, the membrane having a dynamic modulus at 30° C. measured with a frequency of 110 Hz of at least about $1.5 \times 10^8 (100-\text{Pr}\rho)\text{dyn/cm}^2$ wherein Pr$\rho$ is a porosity by percentage, a mean pore size represented by D($\mu$m) of about 0.01 $\mu$m to about 20 $\mu$m and at the same time a porosity in a plane of at least one plane of at least about 30% or a number of pores in a plane per 1 cm$^2$ of about $6 \times 10^5$/D about $3 \times 10^7$/D.

Further to achieve the foregoing objects and in accordance with the purpose of the invention, as embodied and broadly described herein, the process of the present invention for preparing such a porous regenerated cellulose membrane comprises: casting a cuprammonium solution of cellulose having a viscosity average molecular weight of at least about $5 \times 10^4$ in an atmosphere of at least one organic solvent having a boiling point of at most 100° C. and a solubility in water of at least about 10% by weight and having no hydroxyl group to cause micro-phase separation and regenerating the membrane formed with an acid and washing the membrane with water.

The accompanying drawings, which are incorporated in and constitute a part of this specification, illustrate the invention and, together with the description, serve to explain the principles of the invention.

A first characteristic feature of this invention resides in that the porous regenerated cellulose membrane of this invention consists of cellulose molecules having a viscosity average molecular weight of at least about $5 \times 10^4$. Since the conventional porous regenerated cellulose membrane is brittle in its dry state, the porous membrane is usually immersed in a swelling agent such as glycerine to prevent the porous membrane from becoming dry. With increased molecular weights the strength of the porous membrane increases and the brittleness can be improved. As a result it becomes easy to handle the porous membrane. When the porous membranes are compared with each other at the same porosity, breakage of the porous membranes decreases with increased viscosity average molecular weights of the cellulose. The influence of the viscosity average molecular weight on the properties of the porous membrane tends to become constant as the viscosity average molecular weight increases. Thus, when the viscosity average molecular weight is from about $5 \times 10^4$ to about $5 \times 10^5$, the porous membrane can be easily handled for practical purposes. Accordingly, the porous regenerated cellulose membrane has sufficient mechanical properties even in its dry state even if the porous membrane does not contain a swelling agent such as glycerine. From the viewpoint of the ease of preparing the porous membrane it is preferred that the viscosity average molecular weight is from about $5.5 \times 10^4$ to about $3 \times 10^5$.

A second characteristic feature of this invention resides in that the crystalline region of the cellulose constituting the porous regenerated cellulose consists essentially of cellulose II crystal, cellulose III-2 crystal or a mixture thereof. This means that the internal part of the crystalline region consists essentially of cellulose molecules, unlike cellulose derivatives in which the hydroxyl groups of cellulose molecules are substituted with other groups. The cellulose II crystal or the cellulose III-2 crystal is chemically and thermally stable. The porous regenerated cellulose membrane consisting essentially of cellulose III-2 crystal can be prepared by immersing a porous regenerated cellulose membrane in liquid ammonia for 10 seconds and then removing the ammonia from the membrane at 20° C. The thermal stability of the membrane thus obtained remarkably increases.

A third and most characteristic feature of this invention resides in that the degree of crystal orientation at a crystal face of (101) in the crystalline region in the direction of the surface of the porous membrane is from about 5% to about 40%, and preferably from about 10% to about 30%. Since the (101) face is a plane vertical to hydrogen bonds, it can be considered that with a degree of crystal orientation of at most about 40% at the (101) face in the crystalline region in the direction of the surface of the porous membrane, the hydrogen bonds are configurated at random to form a strong porous membrane. Further the strength of the porous membrane having a degree of crystal orientation of from about 5% to about 40% at the (101) face in the crystalline region becomes at least about $1.5 \times 10^7 (100-Pr\rho) dyn/cm^2$ and the dynamic modulus at 30° C. measured with a frequency of 110 Hz of most of the porous membrane which satisfies this degree of crystal orientation becomes in the range of from about $1.5 \times 10^8 (100-Pr\rho) dyn/cm^2$ to about $2 \times 10^9 (100-Pr\rho) dyn/cm^2$. The feature of this crystal orientation appears in the swelling deformation when the porous membrane is immersed in water or an organic solvent. More specifically, with increased degrees of crystal orientation at the (101) face, the swelling in the direction of thickness of the membrane which is made swollen with water becomes greater compared with that in the two other directions. On the other hand, the porous membrane according to this invention swells almost to the same degree in all directions. A preferred dynamic modulus at 30° C. measured with a frequency of 110 Hz of the porous membrane employed in this invention is in the range of from about $4.5 \times 10^8 (100-Pr\rho) dyn/cm^2$ to about $2 \times 10^9 (100-Pr\rho) dyn/cm^2$.

A fourth characteristic feature resides in that the porous regenerated cellulose membrane has a mean pore size $D(\mu m)$ of about 0.01 $\mu m$ to about 20 $\mu m$ and at the same time a porosity in a plane of at least one plane of at least about 30% or a number of pores in a plane per 1 cm$^2$ (i.e., a pore density) of about $6 \times 10^5/D$ to about $3 \times 10^7/D$. When the porosity in a plane is greater than about 30%, the rate of filtration of the porous membrane increases to a great extent and also the capacity of filtration increases. Theoretically the rate of filtration is proportional to the porosity calculated in terms of volume fraction of pore (herein referred to "porosity") and the capacity of filtration is almost proportional to the porosity. Thus in this invention the porosity in a plane is at least about 30%. A higher porosity, however, is preferred. It is preferred that the porosity in a plane is about 55% to about 90%. From the view point of ease of handling of the porous membrane and its mechanical properties the porosity in a plane is not higher than 90%.

The liquid to be filtered is filtered from the frontal surface of a porous membrane through to the back surface of the porous membrane. Provided the porosity of two porous membranes is the same, the rate of filtration and the capacity of filtration with a porous membrane whose frontal and back surfaces have the same mean pore size are greater than with a porous membrane whose back surface has a greater mean pore size than the frontal surface.

The mean pore radius mean $\bar{r}_3$ defined by the equation $$\bar{r}_3 = \frac{\int_0^\infty r_3 N(r) dr}{\int_0^\infty r_3 N(r) dr} \tag{1}$$

wherein
  N(r) is a pore size distribution function,

N(r)dr represents the number of pores whose pore radius is present in the range of r to r+dr per 1 cm$^2$ of a porous membrane.

The mean pore size in this invention is defined as $2\bar{r}_3$.

The rate of ultrafiltration per one pore is almost proportional to the fourth power i.e. $(\bar{r}_3)^4$ and proportional to porosity. Accordingly, in order to increase only the rate of filtration, a greater $\bar{r}HD.3$ is preferred. However, a maximum pore size is determined depending upon the particle size to be separated. Thus the range of mean pore size($2\bar{r}_3$) which fully exhibits the features of a hydrophilic screen-type filter is about 0.01 μm to 20 μm. When the mean pore size is less than about 0.01 μm, the number of particles to be separated by the porous membrane whose shape is not spherical is increased and as a result, the characteristic features of the porous membrane of this invention cannot be efficiently used.

As will be described below, the substance which can be separated or condensed using the porous membrane of this invention is a selected component contained in a liquid or a gaseous mixture and the filtration is conducted at a high velocity. With smaller mean pore sizes the rate of filtration remarkably decreases. Also, it is preferred that the thickness of the porous membrane is thinner. However, from the viewpoint of ease of handling the porous membrane and avoidance of pinholes existing in the porous membrane, the thickness is typically at least about 5 μm, and preferably in the range of about 30 μm to about 300 μm. When the mean pore size is less than about 0.01 μm, the probability of existence of non-open pores (non-straight-through pores) increases and the efficiency of a so-called filtration membrane becomes lower than that predicted from a porous membrane having open pores (straight-through pore). Thus in order to avoid the existence of non-open pores in a porous membrane, it is necessary that the mean pore size is at least about 0.01 μm. The existence of pinholes which increases with increased mean pore sizes can be prevented by increasing the thickness of the porous membrane but the rate of filtration is inversely proportional to the thickness of a porous membrane. Thus the thickness of a porous membrane is preferably thinner. Due to these contradictory trends, a most appropriate range of the thickness of the porous membrane closely relates to a process for its preparation.

Furthermore, when a peak temperature[$T_{max}$(° C.)] at a dynamic mechanical loss tangent (tan δ) measured with a frequency of 110 Hz—temperature (T) curve is at least about 250° C. and typically not higher than about 320° C., preferably from about 270° C. to about 300° C. the thermal stability of the porous membrane increases and the thermal resistance in an organic solvent increases. Also when the peak temperature $T_{max}$(° C.) is about 200° C. to about 250° C. and at the same time a peak value of the dynamic mechanical loss tangent (tan δ)$_{max}$ is at least about 0.15 and typically less than about 0.30, preferably from about 0.2 to about 0.28, the thermal resistance of the porous membrane slightly reduces but the adsorbability of the porous membrane is improved.

In addition, when the porous membrane has polymer particles as the unit element produced by micro-phase separation in at least one plane of the porous membrane and at least about 50% by volume fraction of the polymer particles, preferably about 60 to 100% by volume fraction of the polymer particles have a size of about 0.01 μm to about 1 μm, the adsorbability of the porous membrane further increases advantageously. It may be considered that these fine polymer particles apparently increases the surface area of the porous membrane and the openings among the fine polymer particles form fine pores which improve the adsorbability of the porous membrane.

A first characteristic feature of the process for preparing the porous regenerated cellulose membrane according to this invention resides in that a porous membrane is prepared in the atmosphere of an organic solvent having a boiling point of at most about 100° C. and a solubility in water of at least about 10% by weight and having no hydroxyl group. The mean pore size of the porous membrane prepared from a cellulose cuprammonium solution by the conventional method is less than about 0.01 μm, while that of the porous membrane prepared by the method of this invention ranges from about 0.01 μm to about 20 μm, and in addition, the pore density increases and the number of straight-through pores increases compared with the conventional porous membrane.

A second characteristic feature of the process for preparing the porous regenerated cellulose membrane according to this invention resides in that micro-phase separation occurs in the atmosphere of the organic solvent. The term "micro-phase separation" means a state where a cellulose polymer rich phase or a cellulose polymer lean phase is dispersed as particles having a diameter of about 0.01 μm to about 5 μm in the cellulose cuprammonium solution and stabilized. As this characteristic feature of the present process it is clear that the porous membrane starts losing transparency. More specifically, according to the process of this invention the cellulose cuprammonium solution undergoes micro-phase separation at the formation of a porous membrane and then undergoes coagulation and regeneration. The organic solvent capable of causing micro-phase separation is required to have no hydroxyl group and a solubility in water of at least about 10% by weight.

The atmosphere of the organic solvent which can be employed may be either vaporous or liquid.

In order for the organic solvent to be employed in the vapor atmosphere, the boiling point of the organic solvent is important. The micro-phase separation of the cellulose cuprammonium solution does not occur in the vapor atmosphere of an organic solvent having a boiling point of higher than about 100° C. and the porous membrane formed becomes transparent or a skin layer is formed on the surface of the porous membrane and as a result, the pore size in the surfaces of the porous membrane becomes less than 0.01 μm. The lower the boiling point, the better. However, it is preferred that the boiling point of the organic solvent is typically at least 0° C. from the viewpoint of controlling the conditions of the process. On the other hand, when the atmosphere of the organic solvent is liquid, the boiling point of the organic solvent is not particularly important.

Exemplary organic solvents having a boiling point of at most about 100° C. and a solubility in water of at least about 10% by weight and having no hydroxyl group which can be employed in this invention include acetone, methyl ethyl ketone, acetaldehyde, trimethylamine, allylamine, isoamylamine, isobutylamine, isopropylamine, ethylamine and propylamine.

Explanation will now be given of the atmosphere of an organic solvent which is vaporous.

When a cellulose cuprammonium solution is cast in the vapor atmosphere containing at least one organic solvent having a boiling point of at most about 100° C., preferably at most about 70° C. and a solubility in water of at least about 10% by weight and having no hydroxyl group to form a porous membrane, the pore size, the pore density and the porosity increase compared with those of a porous membrane prepared by the conventional process. When the concentration of the vapor atmosphere of the organic solvent is less than about 50% of the saturated vapor pressure, the pore size becomes smaller, and the pore density is reduced and the percentage of straight-through pores present is also reduced. On the other hand, when the cellulose cuprammonium solution is formed into a porous membrane in the vapor atmosphere of the organic solvent, a skin layer which would form on the solvent-vaporizing surface of the porous membrane disappears and pores having a mean pore size of at least about 0.01 μm are formed on the solvent-vaporizing surface. With increased concentrations of the vapor atmosphere of the organic solvent, in an atmosphere where the porous membrane is prepared, the pore size of the porous membrane becomes larger and the pore density increases and also straight-through pores also increases. Thus it is preferred that the concentration of the vapor atmosphere of the organic solvent is at least about 50% of the saturated vapor pressure.

Further it is possible to obtain a porous membrane in a shortened production period of time with good reproducibility by adding the organic solvent having a boiling point of at most about 100° C. and a solubility in water of at least about 10% by weight and having no hydroxyl group to the cellulose cuprammonium solution in an amount up to the gel point or in an amount of at most about 30% by weight and typically not less than about 7% by weight, preferably not less than about 10% by weight, based on the cellulose cuprammonium solution.

Exemplary organic solvents added to the cellulose cuprammonium solution which can be employed in this invention include ketones such as acetone, methy ethyl ketone and acetaldehyde and amines such as trimethylamine, allylamine, isoamylamine, isobutylamine, ethylamine and propylamine. It is preferred that the organic solvents have a low molecular weight from the viewpoint of shortening the period of time causing micro-phase separation and work efficiency in the subsequent treatment procedures such as coagulation, regeneration, washing and drying.

The cuprammonium solution which can be employed in this invention means a solution of copper and ammonia as the main components which is a dark blue solvent medium called as Schweitzer's reagent and which can substantially dissolve cellulose. This solution may contain a cation other than copper or a solvent other than ammonia in a small amount.

A third characteristic feature of the process of this invention resides in the use of a cuprammonium solution of cellulose having a viscosity average molecular weight of at least about $5 \times 10^4$. The advantages of using such a viscosity average molecular weight have already been described afore.

The concentration of cellulose in a cellulose cuprammonium solution for casting which can be employed in this invention in obtaining a porous membrane which fully satisfies the properties for practical purposes is typically about 5% by weight to about 10% by weight based on the total weight of the cellulose cuprammonium solution. When the concentration of cellulose is less than about 5% by weight, it is difficult to control the thickness of the porous membrane and accordingly to produce the porous membrane with good reproducibility. On the other hand, when the concentration of cellulose is more than about 10% by weight, the porous membrane becomes hard, the porosity decreases and the pore density also decreases.

After the cellulose cuprammonium solution is cast on a smooth plane surface in the atmosphere containing at least one organic solvent having a boiling point of at most about 100° C. and a solubility in water of at least about 10% by weight and having no hydroxyl group to cause micro-phase separation, the membrane formed is regenerated by an acid which dissolves the copper remaining in the membrane and does not decompose cellulose, such as an about 0.5 to 5% by weight aqueous sulfuric acid solution, an about 1 to 8% by weight aqueous hydrochloric acid and an about 0.2 to 10% by weight aqueous phosphoric acid solution at a temperature of about 0° C. to about 40° C. for about 1 minute to about 60 minutes, then washed with water and dried at its constant length at a temperature of at least about 5° C. in the air or freeze-dried to give a porous regenerated cellulose.

In order to shorten the process for the preparation of a porous regenerated cellulose membrane according to this invention and to further increase the porosity of the membrane, it is preferred that the water in the membrane after washing the porous regenerated cellulose with water is exchanged with an organic solvent having a boiling point of at most about 70° C. by immersing the membrane in the organic solvent having a boiling point of at most about 70° C. at a temperature of about 0° C. to about 30° C. for about 1 to 60 minutes, and subsequently dried by inserting the membrane between porous flat substances such as filter paper and ceramic at a temperature of about 10° C. to about 40° C. for at least about 10 hours.

Exemplary organic solvents having a boiling point of at most about 70° C. which can be employed in this invention include ketones such as acetone and amines such as triethylamine, isobutylamine, isopropylamine and propylamine. Of these organic solvents acetone is preferred.

Moreover, in order to further increase the pore size and the pore density and to reduce streaks, pinholes or peeling formed in the preparation of a porous membrane, it is preferred that, after the cellulose cuprammonium solution has been cast in the atmosphere of an organic solvent having a boiling point of at most 100° C. and a solubility in water of at least about 10% by weight and having no hydroxyl group and is in the state of micro-phase separation but before a polymer lean phase exudes to the surface of the membrane formed, the membrane is immersed in a mixed solution containing at least one organic solvent having no hydroxyl group and a solubility at 20° C. to a 28% by weight aqueous ammonia solution of at least about 10% by weight (i.e. the amount by weight soluble in 100 ml of a 28% by weight aqueous ammonia solution at 20° C.) and not swelling the cellulose. The above described mixed solution serves to accelerate micro-phase separation.

The mixed solution which can be employed in this invention is a mixed solution of the organic solvent, ammonia and water. The concentration of the ammonia is typically about 0.2% by weight to about 5% by weight, preferably about 2% by weight to about 3% by weight based on the weight of the water and at the same time the concentration of the organic solvent is typically about 10% by weight to about 70% by weight, preferably about 25% by weight to about 60% by weight based on the weight of the water. When the concentration of the organic solvent in the mixed solution is less than about 10% by weight based on the weight of the water or when the organic solvent has a hydroxyl group, the micro-phase separation does not occur or a skin layer is formed on the surface of the porous membrane formed and the mean pore size of the porous membrane becomes less than about 0.01 μm. Accordingly, it is preferred that the organic solvent has a higher solubility in water, especially in an aqueous alkaline solution and at the same time the organic solvent is required not to swell the cellulose.

Occurrence of micro-phase separation can be judged by opacification during the formation of the membrane directly with the naked eye or confirmed by the presence of particles having a diameter of at least 1 μm in the membrane formed by an electron microscope.

It is important that the organic solvent in a mixed solution has no hydroxyl group. In a mixed solution containing an organic solvent having a hydroxyl group, micro-phase separation does not occur and the membrane formed becomes a transparent film or a skin layer is formed on the surface of the membrane or the skin layer formed is solidified in the form of gel. As a result, the pore size at the surfaces of the membrane becomes less than about 0.01 μm.

The organic solvent not swelling the cellulose means that a piece of the porous regenerated cellulose membrane having a size of 1.00 cm (length)×1.00 cm (width) if immersed in the organic solvent at 20° C. for 10 minutes, becomes a size of 1.05–0.97 cm (length)×1.05–0.97 cm (width).

Suitable examples of such organic solvents which can be employed in this invention include ketones such as acetone and methyl ethyl ketone and amines such trimethylamine allylamine, isoamylamine, isobutylamine and isopropylamine. It is prefereed that the organic solvents have a low molecular weight from the viewpoint of shortening the period of time causing microphase separation and work efficiency in the subsequent treatment procedures such as regeneration, washing and drying.

According to one preferred embodiment of this invention in order to increase the pore density and the porosity of the porous regenerated cellulose membrane it is preferred to cast the cellulose cuprammonium solution in the atmosphere of acetone to form a membrane, to immerse the membrane formed in a mixed solution of acetone, ammonia and water after the occurrence of micro-phase separation of the cellulose cuprammonium solution, to regenerate the membrane with an acid, e.g., a 2% by weight aqueous sulfuric solution, to exchange the water in the membrane with an organic solvent having a boiling point of at most 70° C. and to dry the resulting membrane. When the mixed solution of acetone, ammonia and water is employed, the concentration of the ammonia is more preferably about 0.2% by weight to about 3% by weight based on the weight of water and at the same time the concentration of the acetone is more preferably about 15% by weight to about 65% by weight based on the weight of the water. In addition, when acetone is employed as the organic solvent having a boiling point of at most about 70° C., the production period of time can be shortened and the pore density and the porosity of the porous membrane can also be increased, resulting in good filtration performances.

In the porous membrane according to this invention the polymer chains effectively form pores and the number of the free ends of the polymer chains is small. Thus the obtained porous membrane has a much higher mechanical strength than the conventional porous membrane.

The atmosphere of an organic solvent which is liquid will now be illustrated.

A mixed solution containing at least one organic solvent having no hydroxyl group and a solubility at 20° C. to a 28% by weight aqueous ammonia solution of at least 10% by weight and not swelling cellulose whose concentration is in such a range that causes the microphase separation of a cellulose cuprammonium solution is prepared. The cellulose cuprammonium solution can be either cast and then immersed in the above described mixed solution or directly cast into the mixed solution to form a porous membrane. The pore size, the pore density and the porosity of the porous membrane thus obtained increase compared with those of the porous membrane obtained by the conventional method.

The mixed solution which can be employed in this invention is a mixed solution of the organic solvent, ammonia and water. When the concentration of the organic solvent is about 10% by weight to about 70% by weight based on the weight of the water and at the same time the concentration of the ammonia is at most about 5% by weight based on the weight of the water, the pore size becomes larger and the number of pores increases and the percentage of straight-through pores present also increases. It is preferred that the concentration of the organic solvent is about 25% by weight to about 60% by weight and at the same time that of the ammonia is at most about 3% by weight based on the weight of the water.

By casting the cellulose cuprammonium solution in the mixed solution, a skin layer which would usually be formed at the interface of a porous membrane disappears and as a result, pores having a mean pore size of at least 0.01 μm are formed. In this invention when the cellulose cuprammonium solution is cast and then immersed in the mixed solution or directly cast into the mixed solution, the cast starts losing transparency. This means that the cast is undergoing microphase separation also in this method. When the concentration of the cellulose in the cellulose cuprammonium solution is less than about 5% by weight, it is difficult to control the thickness of the porous membrane and accordingly to produce porous membranes with good producibility. On the other hand when the concentration of the cellulose is more than about 10% by weight, the porous membrane obtained becomes transparent, the porosity decreases and also the pore density decreases. Thus when the concentration of the cellulose is about 5% by weight to 10% by weight, the porous membranes obtained fully satisfies the properties of porous membranes for practical purposes.

Suitable examples of such organic solvents include ketones such as acetone, methyl ethyl ketone and amines such as trimethylamine, allylamine, isoamylamine, isobutylamine and propylamine.

Especially, according to the process for the preparation of a porous membrane which comprises casting the cellulose cuprammonium solution to form a membrane, immersing the membrane formed into a mixed solution of acetone, ammonia and water, regenerating the membrane with an acid, e.g., a 2% by weight of aqueous sulfuric acid solution, washing the membrane obtained with water, exchanging the water in the membrane with acetone and drying the resulting membrane, the production period of time of the porous membrane can be shortened and the pore density and the porosity also increase. As a result, the filtration performances become good. In addition, according to this process the production of a porous membrane can be advantageously carried out continuously and the form of the porous membrane such as flat type, tubular type and spiral type can also be varied.

The porous regenerated cellulose membranes obtained by the process of this invention can be employed in the separation or elimination of a selected compound in an aqueous liquid thereof or in a gaseous mixture thereof, and as membranes for artificial kidney, liver and pancreas and membranes for ultrafiltration in any field. The porous regenerated cellulose membrane which is hydrophilic and has mechanically excellent strength, can especially be suitably employed in the field relating to living bodies such as medical science and biochemical industry or in the field of foods and fermentation.

BRIEF DESCRIPTION OF THE DRAWING

In the accompanying drawings.

Figure 1:
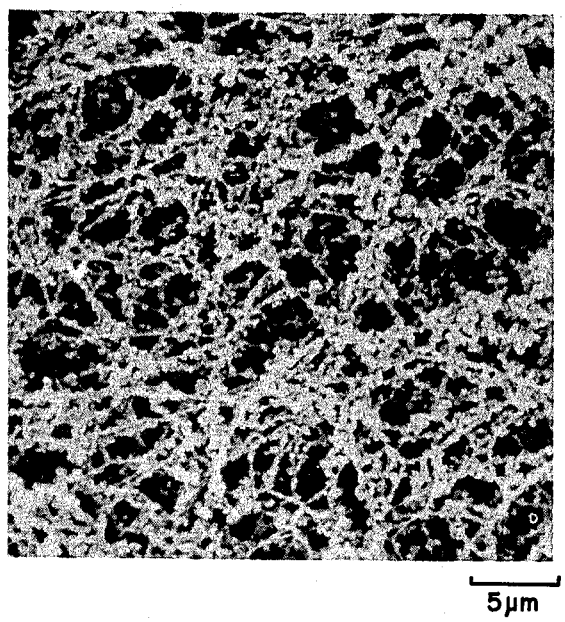
FIG. 1 is a scanning electron microscopic photograph ($\times 3000$ magnifications) of part of the frontal surface of a porous regenerated cellulose membrane obtained in Example 8 according to this invention.
Figure 2:
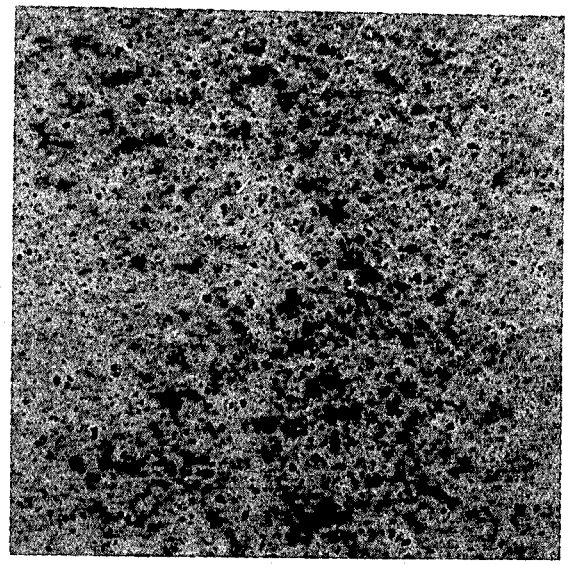
FIG. 2 is a scanning electron microscopic photograph ($\times 3000$ magnifications) of part of the back surface of the same porous regenerated cellulose membrane as in FIG. 1.

METHODS FOR MEASURING PARAMETERS TO BE USED FOR SPECIFYING VARIOUS PROPERTIES OF THE PRESENT INVENTION

A. Viscosity Average Molecular Weight

Viscosity average molecular weight (Mv) of cellulose is calculated by inserting the intrinsic viscosity number $[\eta]$ (ml/g) measured in a cuprammonium solution at 20° C. into the following equation:

$$Mv = [\eta] \times 3.2 \times 10^3 \qquad (2)$$

B. Identification of Cellulose II Crystal and Cellulose III-2 Crystal and Degree of Crystal Orientation The X-ray diffraction intensity is measured by using an X-ray generator (RU-200PL manufactured by Rigaku Denki), a goniometer (SG-9R manufactured by Rigaku Denki), a scintillation counter and a pulse height analyzer. The X-ray generator is operated at 30 kV and 80 mA and Cu-K$\alpha$ ray (wavelength $\lambda = 1.5418$ Å) monochromatized by a nickel filter is used.

In the determination of crystal structure, X-ray is made perpendicularly incident upon the surface of a flat porous membrane. The X-ray diffraction intensity is recorded from 4° to 35° of $2\theta$ at a scanning speed of 1°/min., a chart speed of 10 mm/min., a time constant of one second, a divergence slit of $\frac{1}{2}°$, a receiving slit of 0.3 mm and a scattering slit of $\frac{1}{2}°$.

The cellulose II crystal is characterized by three reflections, i.e., $2\theta = 12°$ (the reflection at the (101) face), $2\theta = 20.2°$ (the reflection at the (10$\bar{1}$) face) and $2\theta = 21°$ (the reflection at the (002) face). The cellulose III-2 crystal is characterized by two reflections, i.e., $2\theta = 12°$ (the reflection at the (101) face) and $2\theta = 20°$ (the reflection at the (10$\bar{1}$) face).

In the measurement of the degree of crystal orientation, X-ray is made incident in parallel with the surface of a flat porous membrane.

The goniometer is set at a $2\theta$ of 12° and scanning is conducted in the range of from $-30°$ to $+30°$ in the azimuthal direction according to a method of symmetrical transmission, and the diffraction intensity in the azimuthal direction is recorded. Furthermore, the diffraction intensities at $-180°$ and $+180°$ in the azimuthal direction are recorded. At this measurement, the scanning speed is 4°/min., the chart speed is 10 mm/min., the time constant is one second, the collimeter is characterized by 2 mm$\phi$ and the receiving slit has a length of 1.9 mm and a width of 3.5 mm.

The degree of crystal orientation is determined from the obtained diffraction intensity curve in the azimuthal direction according to the following procedures. A mean value of the diffraction intensities at $\pm 180°$ is evaluated, and a horizontal line is drawn as a base line to pass through the point of the mean value. A perpendicular line is drawn to the base line from the top of a peak and the mid-point of the perpendicular line is determined and a horizontal line passing through the midpoint is drawn. The distance between the two intersecting points of the horizontal line and the diffraction intensity curve is measured and the measured curve is converted to an orientation angle H(°) in degrees (°). The degree of crystal orientation is represented by the equation:

$$\text{Degree of Crystal Orientation } (\%) = (180° - H)/180° \times 100 \qquad (3)$$

When the crystal is non-oriented, H becomes 180 and the degree of crystal orientation is 0%.

C. Porosity (Pr$\rho$)

A circle having a diameter of 47 mm is cut from a flat porous membrane and dried in vacuum to such an extent that the water content is at most 0.5% by weight. The porosity (Pr$\rho$(%)) is given by the equation:

$$Pr\rho(\%) = \left(1 - \frac{W}{1.50 \times 17.34 \times d}\right) \times 100 \qquad (4)$$

wherein d is the thickness of the dried porous membrane in cm and

W is the weight of the dried porous membrane in gram.

D. Mean Pore Radius ($\bar{r}_3$), Porosity in a Plane (Pr) and Pore Density (N)

Electron microscopic photographs of the frontal and back surfaces of a porous membrane are taken using a scanning electron microscope (JSM-U3 manufactured by Japan Electron Optics Laboratory Co., Ltd.) at the highest magnification and at an enlargement of at most eight powers. Then a pore size distribution function N(r) is calculated from the obtained photographs according to the conventional method and inserted into the equation:

$$\bar{r}_3 = \frac{\int_0^\infty r^3 N(r) dr}{\int_0^\infty r^2 N(r) dr} \quad (1)$$

More specifically, in order to calculate a pore size distribution of a porous membrane, the part of the scanning electronic microscopic photograph of the porous membrane is enlarged and printed at an appropriate size, for example, 20 cm×20 cm, and 20 test straight lines at regular intervals are drawn on the obtained photograph. Each of the straight lines crosses a number of pores and the length of the straight line present within each pore which crosses pores in the frontal and back surfaces of a porous membrane is measured to obtain a frequency distribution function. Using this frequency distribution function, $N(r)$ is determined, for example, according to a method of stereology (see, Norio Suwa "Stereology", 1977, Iwanami Shoten, Tokyo). The porosity in a plane (Pr) is calculated using $N(r)$ from the equation:

$$Pr(\%) = \pi \int r^2 N(r) \, dr \times 100 \quad (5)$$

The Pore density (N) is given by the formula $$N = \int_0^\infty N(r) dr \quad (6)$$

When judgement of pores in the frontal and back surfaces of the porous membrane is difficult, all the pores observed in the photographs are assumed as pores present in the surfaces of the porous membrane. In this case one-third of N calculated from the formula (6) is defined as the pore density in this invention and also twice of the porosity in a plane (Pr) calculated from the equation (5) is defined as the porosity in a plane in this invention.

E. Dynamic Mechanical Loss Tangent (tan δ) and Dynamic Modulus

Dynamic mechanical loss tangent (tan δ) and dynamic modulus are measured by using an apparatus for direct reading viscoelasticity (manufactured by Toyo Baldwin, Rheo-Vibron DDV-IIc) at a frequency of 110 Hz in dry air at a temperature increasing at an average rate of 10° C./minute with a sample strip having a width of 1 mm and a length of 5 cm cut from a porous membrane obtained.

A peak temperature ($T_{max}$) of tan δ and a peak value (($\tan \delta)_{max}$) of tan δ are obtained from the tan δ-temperature curve and a dynamic modulus at 30° C. is obtained from the dynamic modulus-temperature curve.

F. Tensile Strength and Elongation

Tensile strength and elongation are measured using a tensile testing machine (Tensilon UTM-II-20 manufactured by Toyo Baldwin) at an initial length of 5 cm and a velocity of 50 mm/minute at 20° C. and a relative humidity of 60% with a sample strip having a width of 2.5 cm and a length of 5 cm cut from a porous membrane obtained.

A further understanding of the present invention, and the advantages thereof, can be had by reference to the following examples.

EXAMPLE 1

Cellulose linter having a viscosity average molecular weight of $2.30 \times 10^5$ was dissolved in a cuprammonium solution containing 6.8% by weight of ammonia and 3.1% by weight of copper prepared by the conventional method at a concentration of 10% by weight, and the solution obtained was added with 12% by weight of acetone of 100% purity and, after stirring, cast on a glass plate by an applicator having a thickness of 500 μm at 30° C. in the air. Then immediately the cast on the glass plate was placed in an atmosphere where the concentration of acetone vapor atmosphere at 20° C. was 70% of the saturated vapor pressure and left to stand for 120 minutes. After occurrence of micro-phase separation was confirmed, the membrane formed on the glass plate was immersed in a 2% by weight aqueous sulfuric acid solution at 20° C. for 15 minutes to regenerate the cellulose and washed with water. Then the membrane peeled off during washing with water was immersed in acetone at 20° C. for 15 minutes to exchange the water in the membrane with the acetone, and dried by inserting the membrane between two sheets of filter paper at 30° C. in the air to give a porous membrane having a thickness of 50 μm. The fine structural features and various properties of the porous membrane obtained are as follows;

| | |
|---|---|
| Viscosity average molecular weight: | $5.7 \times 10^4$ |
| Degree of crystal orientation at (101) face: | 28% |
| Dynamic modulus at 30° C. measured with frequency of 110 Hz: | $9.1 \times 10^9$ dyn/cm$^2$ |
| Mean pore size: | about 1 μm |
| Porosity (Prρ): | 65% |
| Porosity in a plane (Pr): | 45% |
| Pore density | $4.0 \times 10^7$/cm$^2$ |
| $T_{max}$: | 264° C. |
| $(\tan \delta)_{max}$: | 0.15 |

COMPARATIVE EXAMPLE 1

According to the known method described in U.S. Pat. No. 3,883,626, in 1000 ml of acetone was dissolved 100 g of cellulose acetate having an acetyl content of 55.1% at 25° C., and the solution was added with 600 ml of methanol at 25° C., and further 40 g of CaCl$_2$.2H$_2$O was dissolved therein. Then 0 ml, 200 ml, 600 ml and 800 ml of cyclohexanol were added to the resulting solution, respectively, at 25° C. to give casting solutions. Each of these solutions thus obtained was cast on a glass plate at 25° C. at a relative humidity of 60% by the same applicator as employed in Example 1 to obtain four kinds of porous cellulose acetate membranes on the glass plate. Then these porous membranes were saponified with an aqueous sodium hydroxide solution having a pH of 12.0 at 30° C. to give porous regenerated cellulose acetate membranes.

The fine structural features and various properties of these porous membranes are set forth in Table 1.

As can be understood from Table 1 the mean pore size of the porous membrane obtained by regenerating a cellulose derivative is lower than the porous membrane of this invention, the dynamic modulus at 30° C. measured with a frequency of 110 Hz is at most one-third of that of the porous membrane of this invention and the $T_{max}$ is also lower than that of the porous membrane of this invention. Thus, due to these factors the mechanical strength and the thermal resistance of the porous membrane obtained by regenerating the cellulose derivative are remarkably inferior to the porous membrane of this invention.

TABLE 1

| Properties | Run No. | | | |
|---|---|---|---|---|
| | 1 | 2 | 3 | 4 |
| Thickness of membrane ($\mu$m) | 220 | 250 | 260 | 260 |
| Crystal form | Cellulose II | Cellulose II | Cellulose II | Cellulose II |
| Degree of crystal orientation at (101) face (%) | 22 | 16 | 17 | 15 |
| Dynamic modulus at 30° C. measured with frequency of 110 Hz (dyn/cm$^2$) | $2.7 \times 10^9$ | $1.2 \times 10^9$ | $1.1 \times 10^9$ | $8.1 \times 10^8$ |
| Mean pore size ($\mu$m) | 0.05 | 0.10 | 0.50 | 1.00 |
| Porosity (Pr$\rho$)/Porosity in plane (Pr) (%) | 72/52 | 77/57 | 80/58 | 85/61 |
| Pore density (number/cm$^2$) | $6.7 \times 10^9$ | $1.6 \times 10^8$ | $2.6 \times 10^8$ | $9.2 \times 10^7$ |
| $T_{max}$ (°C.) | 192 | 191 | 192 | 190 |
| Mechanical strength (dyn/cm$^2$) | $2.0 \times 10^2$ | $1.6 \times 10^2$ | $1.5 \times 10^2$ | $1.0 \times 10^2$ |

Note:
The viscosity average molecular weights of the cellulose molecule constituting the porous membrances obtained in Run Nos. 1 to 4 were distributed in the range between $1.5 \times 10^4$ and $2.0 \times 10^4$.

EXAMPLES 2 TO 4

In the same cuprammonium solution as employed in Example 1 was dissolved cellulose linter having a viscosity average molecular weight of $2.30 \times 10^5$ at a concentration set forth in Table 2, and the solution obtained was added with 10% by weight of acetone of 100% purity and, after stirring, cast on a glass plate placed in an atmosphere where the concentration of acetone vapor atmosphere at 30° C. was 80% of the saturated vapor pressure by an applicator having a thickness of 250 $\mu$m and left to stand for 60 minutes in the above described atmosphere. After occurrence of micro-phase separation was confirmed, the membrane formed on the glass plate was immersed in a 2% by weight aqueous sulfuric acid solution at 20° C. for 15 minutes and then washed with water. After water was removed from the membrane peeled off from the glass plate during washing with water with a sheet of filter paper, the membrane was immersed in acetone of 100% purity at 20° C. for 15 minutes to exchange the water in the membrane with the acetone and dried by inserting the membrane between two sheets of filter paper at 30° C. in the air. The properties of the porous membranes thus obtained are shown in Table 2.

EXAMPLE 5

Cellulose linter having a viscosity average molecular weight of $2.30 \times 10^5$ was dissolved in the same cuprammonium solution as employed in Example 1 at a concentration of 7% by weight, and the solution obtained was added with 10% by weight of methyl ethyl ketone of 99% purity and, after stirring, cast on a glass placed in an atmosphere where the concentration of methyl ethyl ketone vapor atmosphere at 45° C. was 75% of the saturated vapor pressure by an applicator having a thickness of 250 $\mu$m and left to stand in the above described atmosphere for 30 minutes. After occurrence of micro-phase separation was confirmed, the membrane formed on the glass plate was immersed in a 2% by weight aqueous sulfuric acid solution at 20° C. for 15 minutes and then washed with water. After water was removed from the membrane peeled off from the glass plate during washing with water with a sheet of filter paper, the membrane was immersed in acetone of 100% purity at 20° C. for 15 minutes to exchange the water in the membrane with acetone, and then dried by inserting the membrane between two sheets of filter paper at 30° C. in the air.

The properties of the porous membrane thus obtained are shown in Table 2.

EXAMPLE 6

Cellulose linter having a viscosity average molecular weight of $2.30 \times 10^5$ was dissolved in the same cuprammonium solution as employed in Example 1 at a concentration of 7% by weight, and then the solution obtained was added with 10% by weight of trimethylamine of 70% purity and, after stirring, cast on a glass placed in an atmosphere where the concentration of trimethylamine vapor atmosphere at 30° C. was 85% of the saturated vapor pressure by an applicator having a thickness of 250 $\mu$m and left to stand in the above described atmosphere for 30 minutes. After occurrence of micro-phase separation was confirmed, the membrane formed on the glass plate was immersed in a 2% by weight aqueous sulfuric acid solution at 20° C. for 15 minutes and then washed with water. After water was removed from the membrane peeled off from the glass plate during washing with water with a sheet of filter paper, the membrane was immersed in acetone of 100% purity at 20° C. for 15 minutes to exchange the water in the membrane with acetone and then dried by putting the membrane between two sheets of filter paper at 30° C. in the air.

The properties of the porous membrane thus obtained are shown in Table 2.

COMPARATIVE EXAMPLE 2

Cellulose linter having a viscosity average molecular weight of $2.3 \times 10^5$ was dissolved in the same cuprammonium solution as employed in Example 1 at a concentration of 7% by weight, and the solution obtained was cast on a glass plate placed in an atmosphere where the concentration of methanol vapor atmosphere was 75% of the saturated vapor pressure by an applicator having a thickness of 250 $\mu$m and left to stand for 60 minutes in the above described atmosphere. After occurrence of micro-phase separation was confirmed, the membrane formed on the glass plate was immersed in a 2% by weight aqueous sulfuric acid solution at 20° C. for 15 minutes and then washed with water. After the water was removed from the membrane peeled off during washing with water with a sheet of filter paper, the membrane was immersed in acetone of 100% purity at 20° C. for 15 minutes and dried by inserting the membrane between two sheets of filter paper at 30° C. in the air. The properties of the porous membrane thus obtained are shown in Table 2.

TABLE 2

| Organic solvent | Organic solvent added | Concentration of | Viscosity average molecular | Dynamic modulus measured at 30° C. with frequency of 110 Hz |
|---|---|---|---|---|

TABLE 2-continued

| Example No. | atmosphere | & )amount (weight %) | | cellulose (weight %) | weight | (dyn/cm²) |
|---|---|---|---|---|---|---|
| 2 | acetone | acetone | 10 | 6 | $5.7 \times 10^4$ | $7.1 \times 10^9$ |
| 3 | acetone | acetone | 10 | 8 | $5.7 \times 10^4$ | $7.8 \times 10^9$ |
| 4 | acetone | acetone | 10 | 10 | $5.7 \times 10^4$ | $8.2 \times 10^9$ |
| 5 | methyl ethyl ketone | methyl ethyl ketone | 10 | 7 | $5.7 \times 10^4$ | $1.0 \times 10^{10}$ |
| 6 | trimethylamine | trimethylamine | 10 | 7 | $5.7 \times 10^4$ | $9.2 \times 10^9$ |
| Comparative Example 2 | methanol | — | — | 7 | $5.7 \times 10^4$ | $6.3 \times 10^{10}$ |

| Example No. | Mean pore size (μm) | Porosity (Prp)/ Porosity in plane (Pr) (%) | Pore density (number/cm²) | $T_{max}$ (°C.) | $(\tan\delta)_{max}$ | Degree of crystal orientation at (101) face (%) | Mechanical strength (dyn/cm²) |
|---|---|---|---|---|---|---|---|
| 2 | 0.60 | 72/50 | $5.2 \times 10^7$ | 255 | 0.17 | 17 | $4.7 \times 10^8$ |
| 3 | 0.52 | 69/48 | $5.5 \times 10^7$ | 258 | 0.16 | 20 | $4.9 \times 10^8$ |
| 4 | 0.08 | 65/42 | $4.8 \times 10^7$ | 260 | 0.15 | 26 | $5.1 \times 10^8$ |
| 5 | 0.05 | 59/37 | $5.0 \times 10^7$ | 257 | 0.15 | 28 | $5.7 \times 10^8$ |
| 6 | 0.42 | 61/38 | $3.8 \times 10^7$ | 255 | 0.15 | 19 | $5.4 \times 10^8$ |
| Comparative Example 2 | <0.01 | 8/≃0 | ≃0 | 250 | 0.12 | 38 | $4.1 \times 10^6$ |

Note:
The crystalline region of the porous membranes obtained in Examples 2 to 6 and Comparative Example 2 were only constituted of cellulose II crystal.

EXAMPLES 7 TO 8

Cellulose linter having a viscosity average molecular weight of $2.33 \times 10^5$ was dissolved in the same cuprammonium solution as employed in Example 1 at a concentration of 6% by weight, and the solution obtained was cast on a glass placed in an atmosphere where the concentration of acetone vapor atmosphere at 30° C. was 80% of the saturated vapor pressure at a rate of 0.2 meter per minute by an applicator having a thickness of 300 μm and left to stand in the above described atmosphere for 8 minutes. After occurrence of micro-phase separation and no exudation of a polymer lean phase to the surface of the membrane were confirmed, the membrane formed on the glass plate was immersed in a mixed solution of acetone, ammonia and water having a mixing weight ratio set forth in Table 3 for 15 minutes, then immersed in a 2% by weight aqueous sulfuric acid at 20° C. for 10 minutes and washed with water. After the water was removed from the membrane peeled off from the glass plate during washing with water with a sheet of filter paper, the membrane was immersed in acetone of 100% purity at 20° C. for 15 minutes to exchange the water in the membrane with acetone and dried by inserting the membrane between two sheets of filter paper at 30° C. in the air. The properties of the porous membranes thus obtained are shown in Table 3.

EXAMPLES 9 TO 11

Cellulose linter having a viscosity average molecular weight of $2.33 \times 10^5$ was dissolved in the same cuprammonium solution as employed in Example 1 at a concentration set forth in Table 3, and the solution obtained was cast on a glass placed in an atmosphere where the concentration of acetone vapor atmosphere at 30° C. was 80% of the saturated vapor pressure at a rate of 0.2 meter per minute by an applicator having a thickness of 300 μm and left to stand in the above described atmosphere for 8 minutes during which occurrence of micro-phase separation was confirmed and a polymer lean phase did not exude to the surface of the membrane. Then the membrane formed on the glass plate was immersed in a mixed solution of acetone, ammonia and water where the weight ratio of acetone to water was 33.6% and that of ammonia to water was 0.8% at 20° C. for 15 minutes, then immersed in a 2% by weight aqueous sulfuric acid at 20° C. for 10 minutes and washed with water. After the water was removed from the membrane peeled off from the glass plate during washing with water with a sheet of filter paper, the membrane was immersed in acetone of 100% purity at 20° C. for 15 minutes to exchange the water in the membrane with acetone and dried by inserting the membrane between two sheets of filter paper at 30° C. in the air. The properties of the porous membranes thus obtained are shown in Table 3.

EXAMPLE 12

Cellulose linter having a viscosity average molecular weight of $2.33 \times 10^5$ was dissolved in the same cuprammonium solution as employed in Example 1 at a concentration of 6% by weight, and the solution obtained was added with 10% by weight of acetone of 100% purity and, after stirring, cast on a glass plate placed in an atmosphere where the concentration of acetone vapor atmosphere at 30° C. was 80% of the saturated vapor pressure at a rate of 0.2 meter per minute by an applicator having a thickness of 300 μm and left to stand in the above described atmosphere for 5 minutes and as a result, micro-phase separation occurred and a polymer lean phase did not exude to the surface of the membrane. Then the membrane formed on the glass plate was immersed in a mixed solution of acetone, ammonia and water where the weight ratio of acetone to water was 33.6% and that of ammonia to water was 0.8% at 20° C. for 10 minutes, then immersed in a 2% by weight aqueous sulfuric acid at 20° C. for 10 minutes and washed with water. After the water was removed from the membrane peeled off from the glass plate during washing with water with a sheet of filter paper, the membrane was immersed in acetone of 100% purity at 20° C. for 15 minutes to exchange the water in the membrane with acetone and dried by inserting the membrane between two sheets of filter paper at 30° C. in the air. The properties of the porous membrane thus obtained are shown in Table 3.

EXAMPLE 13

Cellulose linter having a viscosity average molecular weight of $2.33 \times 10^5$ was dissolved in the same cuprammonium solution as employed in Example 1 at a concentration of 6% by weight, and the solution obtained was cast on a glass plate placed in an atmosphere where the concentration of methyl ethyl ketone vapor atmosphere at 30° C. was 75% of the saturated vapor pressure at a rate of 0.2 meter per minute by an applicator having a thickness of 300 μm and left to stand for 8 minutes in the above described atmosphere and as a result, microphase separation occurred in the membrane and a polymer lean phase did not exude to the surface of the membrane. Then the membrane formed on the glass plate was immersed in a mixed solution of methyl ethyl ketone, ammonia and water where the weight ratio of methyl ethyl ketone to water was 33.6% and that of ammonia to water was 0.8% at 20° C. for 15 minutes, then immersed in a 2% by weight aqueous sulfuric acid solution at 20° C. for 10 minutes and washed with water. After the water was removed from the membrane peeled off from the glass plate during washing with water with a sheet of filter paper, the membrane was immersed in acetone of 100% purity at 20° C. for 15 minutes to exchange the water in the membrane with acetone and dried by inserting the membrane between two sheets of filter paper at 30° C. in the air. The properties of the membrane obtained are shown in Table 3.

TABLE 3

| Example No. | Organic solvent atmosphere | Mixed solution | | Concentration of cellulose (weight %) | Viscosity average molecular weight | Dynamic modulus measured at 30° C. with frequency of 110 Hz (dyn/cm²) |
|---|---|---|---|---|---|---|
| | | Ratio of organic solvent to water (weight %) | Ratio of ammonia to water (weight %) | | | |
| 7 | acetone | 33.6 | 0.8 | 6 | $5.85 \times 10^4$ | $1.0 \times 10^{10}$ |
| 8 | acetone | 68.0 | 0.1 | 6 | $5.85 \times 10^4$ | $1.6 \times 10^{10}$ |
| 9 | acetone | 33.6 | 0.8 | 5.5 | $5.85 \times 10^4$ | $9.0 \times 10^9$ |
| 10 | acetone | 33.6 | 0.8 | 8 | $5.85 \times 10^4$ | $1.5 \times 10^{10}$ |
| 11 | acetone | 33.6 | 0.8 | 10 | $5.85 \times 10^4$ | $3.6 \times 10^{10}$ |
| 12 | acetone | 33.6 | 0.8 | 6 | $5.85 \times 10^4$ | $9.8 \times 10^9$ |
| 13 | methyl ethyl ketone | 33.6 | 0.8 | 6 | $5.85 \times 10^4$ | $1.2 \times 10^{10}$ |
| Comparative Example 3 | methanol | 33.6 | 0.8 | 6 | $5.85 \times 10^4$ | $9.0 \times 10^{10}$ |

| Example No. | Mean pore size (μm) | Porosity (Prp)/ Porosity in plane (Pr) (%) | Pore density (number/cm²) | $T_{max}$ (°C.) | $(\tan\delta)_{max}$ | Degree of crystal orientation at (101) face (%) | Mechanical strength (dyn/cm²) |
|---|---|---|---|---|---|---|---|
| 7 | 0.36 | 76/52 | $6.5 \times 10^8$ | 214 | 0.26 | 18 | $2.8 \times 10^8$ |
| 8 | 0.21 | 70/50 | $3.6 \times 10^8$ | 245 | 0.20 | 24 | $3.2 \times 10^8$ |
| 9 | 0.41 | 77/53 | $6.6 \times 10^8$ | 212 | 0.27 | 18 | $2.5 \times 10^8$ |
| 10 | 0.20 | 67/47 | $4.0 \times 10^8$ | 220 | 0.21 | 25 | $3.0 \times 10^8$ |
| 11 | 0.15 | 56/35 | $3.1 \times 10^8$ | 225 | 0.20 | 28 | $3.6 \times 10^8$ |
| 12 | 0.32 | 73/51 | $6.2 \times 10^8$ | 216 | 0.25 | 20 | $2.8 \times 10^8$ |
| 13 | 0.28 | 70/51 | $4.0 \times 10^8$ | 220 | 0.23 | 22 | $2.9 \times 10^8$ |
| Comparative Example 3 | <0.01 | 9/≅0 | ≅0 | 257 | 0.14 | 40 | $3.7 \times 10^8$ |

Note:
The crystalline region of the porous membranes obtained in Examples 7 to 13 and Comparative Example 3 were only constituted of cellulose II crystal.

COMPARATIVE EXAMPLE 3

Cellulose linter having a viscosity average molecular weight of $2.33 \times 10^5$ was dissolved in a cuprammonium solution prepared by the conventional method at a concentration of 6% by weight, and the solution obtained was cast on a glass plate placed in an atmosphere where the concentration of methanol vapor atmosphere at 30° C. was 75% by the saturated vapor pressure at a rate of 0.2 meter per minute by an applicator having a thickness of 300 μm and left to stand in the above described atmosphere for 8 minutes during which micro-phase separation did not occur. Then the membrane formed on the glass plate was immersed in a mixed solution of methanol, ammonia and water where the weight ratio of methanol to water was 33.6% and that of ammonia to water was 0.8% at 20° C. for 15 minutes, then immersed in a 2% by weight aqueous sulfuric acid solution at 20° C. for 10 minutes and washed with water. After the water was removed from the membrane peeled off from the glass plate during washing with water with a sheet of filter paper, the membrane was immersed in acetone of 100% purity at 20° C. for 15 minutes to exchange the water in the membrane with acetone and dried by inserting the membrane between two sheets of filter paper at 30° C. in the air. The properties of the porous membrane thus obtained are shown in Table 3.

EXAMPLES 14 TO 15

Cellulose linter having a viscosity average molecular weight of $2.30 \times 10^5$ was dissolved in the same cuprammonium solution as employed in Example 1 at a concentration of 6% by weight, and the solution obtained was cast on a glass plate by an applicator having a thickness of 300 μm at 30° C. in the air. Then immediately the cast on the glass plate was immersed in a mixed solution of acetone, ammonia and water having a mixing weight ratio set forth in Table 4 for 15 minutes during which micro-phase separation occurred. Subsequently the membrane formed on the glass plate was immersed in a 2% by weight aqueous sulfuric acid solution at 20° C. for 15 minutes and washed with water. After the water was removed from the membrane peeled off from the glass plate during washing with water with a sheet of filter paper, the membrane was immersed in acetone of 100% purity for 15 minutes to exchange the water in the membrane with the acetone and dried by inserting the membrane between two sheets of filter paper at 30° C. in the air. The membrane was not swollen with acetone and the ratio of changing the shape of the membrane before and after the immersion in acetone was less than 2% by weight. The properties of the porous membranes thus obtained are shown in Table 4.

EXAMPLES 16 TO 17

Cellulose linter having a viscosity average molecular weight of $2.30 \times 10^5$ was dissolved in the same cuprammonium solution as employed in Example 1 at a concentration set forth in Table 4, and the solution obtained was cast on a glass plate by an applicator having a thickness of 300 μm at 30° C. in the air. Then immediately the cast on the glass plate was immersed in a mixed solution of acetone, ammonia and water having a mixing weight ratio set forth in Table 4 for 15 minutes during which micro-phase separation occurred. Subsequently the membrane formed on the glass plate was immersed in a 2% by weight aqueous sulfuric acid solution at 20° C. for 15 minutes and washed with water. After the water was removed from the membrane peeled off from the glass plate during washing with water with a sheet of filter paper, the membrane was immersed in acetone of 100% purity for 15 minutes to exchange the water in the membrane with the acetone and dried by inserting the membrane between two sheets of filter paper at 30° C. in the air. The properties of the porous membranes thus obtained are shown in Table 4.

EXAMPLE 18

Cellulose linter having a viscosity average molecular weight of $2.30 \times 10^5$ was dissolved in the same cuprammonium solution as employed in Example 1 at a concentration 6% by weight, and the solution obtained was mixed with 10% by weight of acetone of 100% purity and, after stirring, cast on a glass plate by an applicator having a thickness of 300 μm at 30° C. in the air. Then immediately the cast on the glass was immersed in a mixed solution of acetone, ammonia and water having a mixing weight ratio set forth in Table 4 for 8 minutes during which micro-phase separation occurred. Subsequently the membrane formed on the glass plate was immersed in a 2% by weight aqueous sulfuric acid solution at 20° C. for 15 minutes and washed with water. Then, the membrane was peeled off from the glass plate. After the water was removed from the membrane by putting the membrane between two sheets of filter paper, the membrane was immersed in acetone of 100% purity at 20° C. for 15 minutes to exchange the water with the acetone and dried by inserting between two sheets of filter paper at 30° C. in the air. The properties of the porous membrane thus obtained are shown in Table 4.

EXAMPLE 19

Cellulose linter having a viscosity average molecular weight of $2.30 \times 10^5$ was dissolved in the same cuprammonium solution as employed in Example 1 at a concentration of 6% by weight, and the solution obtained was cast on a glass plate by an applicator having a thickness of 300 μm at 30° C. in the air. Then immediately the cast on the glass plate was immersed in a mixed solution of methyl ethyl ketone, ammonia and water having a mixing weight ratio set forth in Table 4 for 15 minutes during which micro-separation occurred. Subsequently the membrane formed on the glass plate was immersed in a 2% by weight aqueous sulfuric acid solution at 20° C. for 15 minutes and washed with water. After the water was removed from the membrane peeled off from the glass plate during washing with water with a sheet of filter paper, the membrane was immersed in acetone of 100% purity at 20° C. for 15 minutes to exchange the water in the membrane with the acetone and dried by inserting the membrane between two sheets of filter paper at 30° C. in the air. The properties of the porous membrane thus obtained are shown in Table 4.

EXAMPLE 20

Cellulose linter having a viscosity average molecular weight of $2.30 \times 10^5$ was dissolved in the same cuprammonium solution as employed in Example 1 at a concentration of 6% by weight, and the solution obtained was extruded from a linear slit having a slit width of 300 μm into a mixed solution of acetone, ammonia and water having a mixing weight ratio set forth in Table 4 and the membrane formed was immersed in the above described mixed solution for 15 minutes during which micro-phase separation occurred, subsequently immersed in a 2% by weight aqueous sulfuric acid solution at 20° C. for 15 minutes and washed with water. After the water was removed from the membrane with a sheet of filter paper, the membrane was immersed in acetone of 100% purity at 20° C. for 15 minutes to exchange the water in the membrane with the acetone and dried by inserting the membrane between two sheets of filter paper at 30° C. in the air. The properties of the porous membrane thus obtained are shown in Table 4.

COMPARATIVE EXAMPLE 4

Cellulose linter having a viscosity average molecular weight of $2.30 \times 10^5$ was dissolved in the same cuprammonium solution as employed in Example 1 at a concentration of 6% by weight, and the solution obtained was cast on a glass plate by an applicator having a thickness of 300 μm in the air at 30° C. Then immediately the cast on the glass plate was immersed in a mixed solution of methanol, ammonia and water having a mixing weight ratio set forth in Table 4 for 15 minutes during wbich a thin film was formed on the surface of the membrane. Subsequently the membrane formed on the glass plate was immersed in a 2% by weight aqueous sulfuric acid solution at 20° C. for 15 minutes and washed with water. After the water was removed from the membrane peeled off from the glass plate during washing with water with a sheet of filter paper, the membrane was immersed in acetone of 100% purity at 20° C. for 15 minutes to exchange the water in the membrane with acetone and dried by inserting the membrane between two sheets of filter paper at 30° C. in the air. The properties of the membrane obtained are shown in Table 4.

TABLE 4

| Example No. | Organic solvent atmosphere | Mixed solution | | Concentration of cellulose (weight %) | Viscosity average molecular weight | Dynamic modulus measured at 30° C. with frequency of 110 Hz (dyn/cm$^2$) |
| --- | --- | --- | --- | --- | --- | --- |
| | | Ratio of organic solvent to water (weight %) | Ratio of ammonia to water (weight %) | | | |
| 14 | acetone | 43.2 | 0.8 | 6 | $5.70 \times 10^4$ | $1.3 \times 10^{10}$ |
| 15 | acetone | 65.0 | 0.8 | 6 | $5.70 \times 10^4$ | $1.8 \times 10^{10}$ |
| 16 | acetone | 43.2 | 0.8 | 8 | $5.70 \times 10^4$ | $1.3 \times 10^{10}$ |
| 17 | acetone | 43.2 | 0.8 | 10 | $5.70 \times 10^4$ | $3.0 \times 10^{10}$ |

TABLE 4-continued

| | | | | | | | |
|---|---|---|---|---|---|---|---|
| 18 | acetone | 43.2 | 0.8 | 6 | $5.70 \times 10^4$ | | $9.6 \times 10^9$ |
| 19 | methyl ethyl ketone | 43.2 | 0.8 | 6 | $5.70 \times 10^4$ | | $1.0 \times 10^{10}$ |
| 20 | acetone | 43.2 | 0.8 | 6 | $5.70 \times 10^4$ | | $1.1 \times 10^{10}$ |
| Comparative Example 4 | methanol | 43.2 | 0.8 | 6 | $5.70 \times 10^4$ | | $9.1 \times 10^{10}$ |

| Example No. | Mean pore size (μm) | Porosity (Prp)/ Porosity in plane (Pr) (%) | Pore density (number/cm²) | $T_{max}$ (°C.) | $(\tan\delta)_{max}$ | Degree of crystal orientation at (101) face (%) | Mechanical strength (dyn/cm²) |
|---|---|---|---|---|---|---|---|
| 14 | 0.32 | 74/50 | $6.1 \times 10^8$ | 210 | 0.28 | 18 | $3.1 \times 10^8$ |
| 15 | 0.20 | 70/48 | $5.0 \times 10^8$ | 208 | 0.26 | 20 | $3.6 \times 10^8$ |
| 16 | 0.16 | 66/45 | $3.9 \times 10^8$ | 212 | 0.28 | 23 | $2.8 \times 10^8$ |
| 17 | 0.09 | 54/35 | $2.1 \times 10^8$ | 220 | 0.24 | 28 | $3.3 \times 10^8$ |
| 18 | 0.28 | 69/45 | $5.7 \times 10^8$ | 210 | 0.26 | 19 | $2.3 \times 10^8$ |
| 19 | 0.26 | 68/44 | $3.8 \times 10^8$ | 216 | 0.25 | 20 | $3.0 \times 10^8$ |
| 20 | 0.30 | 70/49 | $5.8 \times 10^8$ | 208 | 0.27 | 19 | $3.5 \times 10^8$ |
| Comparative Example 4 | <0.01 | 8/≃0 | ≃0 | 262 | 0.13 | 39 | $3.7 \times 10^8$ |

Note:
The crystalline region of the porous membranes obtained in Examples 14 to 20 and Comparative Example 4 were only constituted of cellulose II crystal.

EXAMPLE 21

The porous membranes obtained in Example 4 were rolled up so as to provide a cylindrical filter module. A human blood having 38% of hematocrit value, 7.2 g/dl of total protein, 16 mg/dl of blood urea nitrogen (BUN) and 6.0 mg/dl of uric acid was supplied to the module so as to cause a parallel flow on the surface of the porous membranes at a flow rate of 50 ml/min. The filtration was conducted by circulating 200 ml of the blood. During the filtration, the blood pressures at the inlet and the outlet of the module were maintained at 135 mmHg and 90 mmHg, respectively. The blood composition and the filtrate composition obtained after 2 hours were as follows:

| | Total Protein (g/dl) | BUN (mg/dl) | Uric Acid (mg/dl) |
|---|---|---|---|
| Blood Composition | 7.4 | 10.0 | 3.8 |
| Filtrate Composition | 0.1 | 22.1 | 7.2 |

The result shows that the porous membranes of this invention are useful for plasma separation and an artificial kidney.

For details of other uses of the porous regenerated cellulose membrane of this invention, refer to application Ser. No. 443,077 "NOVEL MEMBRANE FILTRATION USING ULTRAFILTRATION MEMBRANE", filed simultaneously herewith, now abandoned.

We claim:

1. A porous regenerated cellulose membrane consisting essentially of cellulose molecules having a viscosity average molecular weight of at least $5 \times 10^4$, the crystalline region of the cellulose molecules being substantially cellulose II crystal, cellulose III-2 crystal or the mixture thereof and having a degree of crystal orientation at a face of (101) in the crystalline region in the direction of the surface of the membrane of at most 40%, the membrane having a dynamic modulus at 30° C. measured with a frequency of 110 Hz of at least $1.5 \times 10^8(100\text{-}Pr\rho)$ dyn/cm² wherein Prρ is a porosity by percentage, a mean pore size represented by D(μm) of 0.01 μm to 20 μm and at the same time a porosity in a plane of at least one plane of at least 30% or a number of pores in a plane per 1 cm² of $6 \times 10^5/D$ to $3 \times 10^7/D$.

2. Porous regenerated cellulose membrane of claim 1, wherein the porosity in a plane of at least one plane is 55% to 90%.

3. Porous regenerated cellulose membrane of claim 1 having a peak temperature [$T_{max}$(° C.)] at the peak of a dynamic mechanical loss tangent (tan δ) measured with a frequency of 110 Hz of at least 250° C.

4. Porous regenerated cellulose membrane of claim 1 having a $T_{max}$(° C.) of 200° C. to 250° C. and a peak value of the dynamic mechanical loss tangent [(tan δ)$_{max}$] of at least 0.15.

5. Porous regenerated cellulose membrane of claim 1 wherein at least 50% by volume fraction of the polymers constituting the membrane is in the form of particles having a size of 0.01 μm to 1 μm in at least one plane of the membrane.

6. A process for preparing a porous regenerated cellulose membrane which comprises casting a cuprammonium solution of cellulose having a viscosity average moecular weight of at least about $5 \times 10^4$ in a vapor phase of which at least about 50% of the saturated vapor pressure comprises at least one organic solvent selected from the group consisting of acetone, methyl ethyl ketone, acetaldehyde, trimethylamine, allylamine, isoamylamine, isobutylamine, isopropylamine, ethylamine and propylamine to cause micro-phase separation and regenerating the membrane formed with an acid and washing the membrane with water.

7. Process of claim 6 wherein the concentration of the cellulose is 5% by weight to 10% by weight.

8. Process of claim 6 comprising adding the organic solvent to the cellulose cuprammonium solution in an amount up to the gel point or in an amount of at most 30% by weight based on the cellulose cuprammonium solution.

9. Process of claim 6 wherein the organic solvent has a boiling point of at most 70° C.

10. Process of claim 9 wherein the vapor atmosphere of the organic solvent is that of acetone.

11. Process of claim 9 wherein the vapor atmosphere of the organic solvent is that of trimethylamine.

12. Process of claim 6 which comprises exchanging the water in the membrane with an organic solvent having a boiling point of at most about 70° C. after washing the membrane with water.

13. Process of claim 12 wherein the organic solvent is acetone, isobutylamine, isopropylamine or propylamine.

14. Process of claim 12 wherein the organic solvent is acetone.

15. Process of claim 6 which comprises immersing the membrane formed in a mixed solution containing at least one organic solvent having no hydroxyl group and a solubility at 20° C. to a 28 % by weight aqueous ammonia solution of at least 10% by weight and not swelling the cellulose after occurrence of micro-phase separation in the cast membrane of the cellulose cuprammonium solution but before exudation of a polymer lean phase after micro-phase separation to the surface of the membrane.

16. Process of claim 15 wherein the mixed solution is a solution of acetone, ammonia and water.

17. Process of claim 15 wherein the mixed solution is a solution of methyl ethyl ketone, ammonia and water.

18. Process of claim 15 which comprises exchanging the water in the membrane with an organic solvent having a boiling point of at most 70° C. after washing the membrane with water.

19. Process of claim 18, wherein the organic solvent is acetone.

20. Process of claim 6 which comprises casting the cellulose cuprammonium solution directly into a mixed solution containing at least one organic solvent having no hydroxyl group and a solubility at 20° C. to a 28% by weight aqueous ammonia solution of at least 10% by weight and not swelling the cellulose to cause micro-phase separation.

21. Process of claim 20, wherein the mixed solution is a solution of the organic solvent, ammonia and water where the concentration of the organic solvent is 10% by weight to 70% by weight based on the weight of the water and that of the ammonia is at most 5% by weight based on the weight of the water.

22. Process of claim 21, wherein the organic solvent is acetone.

23. Process of claim 20 which comprises exchanging the water in the membrane with an organic solvent having a boiling point of at most 70° C. after washing the membrane with water.

24. Process of claim 23, wherein the organic solvent is acetone.

* * * * *